United States Patent

Guy (10) Patent No.: US 8,616,560 B2
(45) Date of Patent: Dec. 31, 2013

(54) ROTARY CUTTING TOOL

(75) Inventor: Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 884 days.

(21) Appl. No.: 12/765,535

(22) Filed: Apr. 22, 2010

(65) Prior Publication Data

US 2010/0270756 A1 Oct. 28, 2010

(30) Foreign Application Priority Data

Apr. 26, 2009 (IL) .......................... 198377

(51) Int. Cl.
*B23B 31/117* (2006.01)

(52) U.S. Cl.
USPC .............................. 279/9.1; 279/103; 279/903

(58) Field of Classification Search
USPC .......... 279/9.1, 102, 103, 903, 71, 72, 75, 81, 279/904; 409/234
See application file for complete search history.

(56) References Cited

U.S. PATENT DOCUMENTS

| | | | |
|---|---|---|---|
| 2,039,149 A * | 4/1936 | Dodge | 192/45.007 |
| 2,972,486 A | 2/1961 | Better | |
| 3,523,693 A | 8/1970 | Sykes | |
| 4,021,051 A * | 5/1977 | Toyomoto et al. | 279/9.1 |
| 4,660,840 A * | 4/1987 | Mizoguchi | 279/9.1 |
| 5,577,743 A * | 11/1996 | Kanaan et al. | 279/72 |
| 7,891,672 B2 * | 2/2011 | Guy | 279/9.1 |
| 2007/0296162 A1 | 12/2007 | Guy | |

FOREIGN PATENT DOCUMENTS

| | | |
|---|---|---|
| DE | 92 16 024 | 1/1993 |
| GB | 2 030 486 | 4/1980 |

OTHER PUBLICATIONS

International Search Report in PCT/IL2010/000253, dated Aug. 16, 2010.

* cited by examiner

*Primary Examiner* — Eric A Gates
*Assistant Examiner* — Paul M Janeski
(74) *Attorney, Agent, or Firm* — Womble Carlyle (57) ABSTRACT

A chuck for clamping an article has a receiving portion including a receiving bore having a longitudinal axis L, and a radially inwardly facing contoured clamping and receiving inner surface. A clamping sleeve is accommodated in the receiving bore and is rotatable between a releasing position and a securing position. The contoured clamping and receiving surface has one or more clamping segments, each clamping segment having a ramp between a trough and a crest, a second ramp between the crest and a depression, and a third ramp between the depression and the succeeding stop ridge. Rotating the clamping sleeve within the receiving bore causes one or more rollers associated with each clamping segment to cooperate with the contoured clamping surface to effect the releasing and the securing of the article.

19 Claims, 8 Drawing Sheets

ROTARY CUTTING TOOL

FIELD OF THE INVENTION

The present invention disclosure relates to a chuck, and particularly to chucks used for releasably securing cutting tools or work-pieces to machining tools.

BACKGROUND OF THE INVENTION

Chucks are used to removably secure cutting tools or work-pieces to machining tools, such as metal cutting machines. As is well known in the art, chucks generally have a mounting portion which is adapted to be releasably clamped in the machining tool, and a receiving portion which releasably holds a cutting tool or a work-piece.

U.S. Pat. No. 2,039,149 to Dodge discloses a one way clutch (an over-running, or a free-wheeling clutch) coupling a driving element to a driven element, employing rollers relieved from sliding or rolling loads, having very little backlash which is further cushioned by an oil film. The over-running clutch includes inner and outer members, a series of wedge blocks each having on one side a cylindrical surface adapted to be forced into frictional engagement with one of said members, and having a wedge surface on its opposite side, a corresponding series of rollers each arranged between the other of said members and the wedge surface of one of said blocks, and means (i.e., springs) for urging said rollers away from said blocks, said means being independent of said blocks.

When the one way clutch is standing without load, all parts (i.e., the coaxial members, the wedge blocks, the rollers, and the springs) are held snugly in engagement. However, when an over-running load is applied, the springs are coiled by the drag of the over running load which works directly against the force of the springs, thereby reversing the load applied by the springs at rest, and reducing the spring load, until a balance of forces is achieved. Additionally, when over-running starts, oil is introduced to form an oil film on the one of said members into which the cylindrical surfaces of the wedge are forced, thereby reducing friction loads. The reverse occurs when driving load is applied, i.e., the pressure on the wedge block increases, urging the oil film out through oil grooves formed on the cylindrical surfaces of the wedge blocks, and the wedge blocks frictionally engage the one of said members.

GB Patent No. 921,522 to Hopkins and Cooper discloses a chuck for holding work-pieces, such as circular section bars. The chuck includes a generally cylindrical tubular member slitted longitudinally to define at least three fingers. A concentric outer sleeve fits over the cylindrical tubular member. The cylindrical tubular member has an eccentric surface formed on an external finger face of each finger. The outer sleeve has radially inwardly protruding cams on an internal sleeve face thereof. When rotating the sleeve relative to the cylindrical tubular member, the cams of the sleeve slide over the eccentric surface of each finger, urging each finger radially inwardly, and thereby exerting gripping forces on a circular section bar accommodated in the cylindrical tubular member.

U.S. Pat. No. 4,808,049 to Cook discloses a chuck for use on a machine tool. The chuck has a slotted-type collet exhibiting a formed external surface comprising a plurality of exterior cam surface segments disposed circumferentially around the slotted collet. Each of the exterior cam surface segments increases nominally uniformly from a lesser to a greater radius relative to the central axis of the chuck and the slotted collet. The slotted collet cooperates with a tightening sleeve of the tool holder having interior cam surface segments complementary in numbers and in contour to the exterior cam surface segments. Selective rotation of the tightening sleeve relative to the slotted collet causes selective engagement of the complementary interior cam surface segments and the exterior cam surface segments, thereby urging the slotted collet to apply gripping force to a shank of a cutting tool.

U.S. Pat. No. 6,131,916 to Toda discloses a chuck comprising a mounting base and an integral shaft protruding from a center of a front surface of the base and having a tapered surface on the outer peripheral surface thereof. A hole having holding portions and pressure portions which are to be pressurized is formed in the protruding shaft. The holding portions and the pressure portions are alternately arranged, and the holding portions are situated at a plurality of positions equally spaced along an inner periphery of the protruding shaft. Each of the holding portions has a short radius from the center of the hole. The portions to be pressurized are situated between the holding portions and have a long radius from the center of the hole. A rotating cylinder is detachably fitted outside the protruding shaft, and a group of rollers are arranged inside the rotating cylinder so that the axis of the group of rollers is aligned along the axis of the rotating cylinder and supported by an appropriate means. As the rotating cylinder is rotated and moved, the pressure portions are pressed and constricted by the rollers which are in peripheral contact with an outer peripheral surface of the protruding shaft. Thus, the holding portions are expanded (released) in the circumferential direction due to the pressing and constriction of the pressure portions. As a result, an irregular shape of the hole is changed into a perfect circle, facilitating insertion of a proximal portion of a tool into the now perfectly-circular hole. Following insertion of the proximal portion of the tool into the chuck, the rotating cylinder is rotated and moved from the long diameter portion to the short diameter portion of the tapered surface of the protruding shaft. Consequently, the group of rollers stops pressurizing the pressure portions. Thus, the holding portions are not expanded. The proximal portion of the tool in the hole is held by the holding portions, which are now restored to the original shape. When the tool is held in the chuck, the rotating cylinder is removed from the protruding shaft. To remove the tool from the protruding shaft, the rotating cylinder is used again to press and constrict the pressure portion in order to expand the holding portions in the circumferential direction. As a result, the irregular shape of the hole in the clamping position is restored into the perfect circle of the released position, facilitating removal of the proximal portion of the tool from the now perfectly-circular hole.

U.S Published Patent Application No. 2007/0296162A1 to Guy discloses a chuck for releasably securing an article. The chuck includes a receiving portion, one or more rollers, and a clamping sleeve. The receiving portion includes a receiving bore having a longitudinal axis L and a receiving bore surface. The clamping sleeve is accommodated in the receiving bore and is rotatable between a releasing position and a securing position. The clamping sleeve consists of a contoured clamping surface with at least one clamping segment. The clamping segment contains a first ramp between a trough and a crest, and a second ramp between the crest and a depression, wherein the trough, crest and depression are, respectively, at a trough distance $D_T$, a crest distance $D_C$ and a depression distance $D_D$ from the longitudinal axis L, wherein $D_T<D_D<D_C$. The at least one roller is accommodated between the receiving bore surface and the contoured clamping surface. When the clamping sleeve is rotated from the releasing position to the securing position, the first roller rides along the first ramp, passes over the crest and enters the depression. When the clamping sleeve is in the securing position, a first roller of said one or more rollers is accommodated in the depression, and at least one of said one or more rollers applies a radially inwardly directed force against the contoured clamping surface and a radially outwardly directed force against the receiving bore. When the clamping sleeve is in the releasing position, said first roller is not accommodated in the depression.

The chuck provides quick and convenient securing or releasing a cutting tool or a work-piece in and from the chuck. Nevertheless, the depth of the depression is limited, and a further turn of a wrench results in sliding out from the depression, therefore sliding out from the securing position.

SUMMARY OF THE INVENTION

The present invention is directed to a chuck for releasably securing an article. The chuck includes a receiving portion, a clamping sleeve, and at least one roller. The receiving portion includes a receiving bore having a longitudinal axis L and having a contoured clamping surface having at least one clamping segment. The clamping sleeve is accommodated in the receiving bore and is rotatable between a releasing position and a securing position. The clamping segment includes a first ramp between a trough and a crest, a second ramp between the crest and a depression, and a third ramp between the depression and a stop ridge, wherein the trough, crest, depression and stop ridge are respectively, at a trough distance $D_T$, a crest distance $D_C$, a depression distance $D_D$ and a stop ridge distance $D_S$, from the longitudinal axis L, wherein $D_S<D_C<D_D<D_T$ and wherein the trough defines a trough side of the first ramp. The at least one roller is accommodated between the clamping sleeve and the contoured clamping surface. When the clamping sleeve is rotated from the releasing position to the securing position, a first roller of said one or more rollers rides in the direction of rotation of the clamping sleeve, as a consequence of a sliding friction between the rollers and the clamping sleeve, away from the trough along the first ramp, passes over the crest, enters the depression and is stopped by the stop ridge.

When the clamping sleeve is in the securing position, the first roller is accommodated in the depression and at least one of said one or more rollers applies a radially inwardly directed force against the clamping sleeve to frictionally hold the article and a radially outwardly directed force against the contoured clamping surface of the receiving bore. When the clamping sleeve is in the securing position, the first roller is accommodated in the depression, releasing locally the applied forces, which prevents the rollers from sliding backward along the first ramp towards the ridge.

In accordance with a preferred embodiment, the radially inwardly directed force applied by said at least one of said one or more rollers causes the clamping sleeve to contract radially inwardly to thereby frictionally hold the article.

When the clamping sleeve is in the releasing position, said first roller is located on the trough side of the first ramp.

In accordance with a preferred embodiment, the clamping sleeve and the one or more rollers are cylindrical, each roller having a roller axis R that is parallel to the longitudinal axis L.

In accordance with a preferred embodiment, the chuck includes a cylindrical roller cage positioned between the receiving bore surface and the clamping sleeve, the cylindrical roller cage having at least one through-slot, the one or more rollers being accommodated in said through-slot.

In accordance with a preferred embodiment, each clamping segment has three rollers associated therewith. When the clamping sleeve is in the securing position, the first of the three rollers is accommodated in the depression, and a second and a third of the three rollers both apply a radially inwardly directed force against the clamping sleeve and a radially outwardly directed force against the contoured clamping surface.

In another preferred embodiment, exactly one roller is associated with the at least one clamping segment. When the clamping sleeve is in the securing position, said one roller is accommodated in the depression, and also applies the radially inwardly directed force against the clamping sleeve and a radially outwardly directed force against the contoured clamping surface.

In accordance with some specific applications, the article is a rotary machine tool.

The present invention has the preferred advantages as to a firm securing without any additional locking means. Preferably it allows a tighter locking without the risk of sliding out from the securing position, neither forward nor backward.

In accordance with the present invention, the contoured clamping surface faces radially inwardly, wherein the contoured clamping surface of the aforementioned prior art faces radially outwardly. As a consequence, an internal grinding for creating the contoured clamping surface can be used, wherein an external grinding is used in the prior art. A significant smaller diameter grinding stone can be used for an internal grinding, which provides the advantage of creating a deeper trough, resulting in a higher stop ridge. A higher stop ridge ensures complete blocking of the roller, since the roller can not pass over the high stop ridge. A further turn of a wrench brings the roller closer to the stop ridge, resulting in tougher locking forces. By virtue of the tough locking forces, the force required for turning the wrench is minimal, and can be even done as a manual process. After the primary locking, as the article is secured forcibly, it turns into an integral part of the chuck.

Further or additional preferred advantages of the present invention are obvious from the general discussion above as well as the detailed discussion of preferred embodiments as provided below. In particular, the present invention prevents risks of undesired release of the cutting tool or the work-piece secured in the chuck by an improved securing mechanism.

BRIEF DESCRIPTION OF THE DRAWINGS

For a better understanding of the present invention and to show how the same may be carried out in practice, reference will now be made to the accompanying drawings, in which.

DETAILED DESCRIPTION OF EXEMPLAR EMBODIMENTS

Attention is drawn to FIGS. 1 to 5. In accordance with a first embodiment, a chuck 30 releasably secures a tool shank 32 of a cutting tool in an integrally-formed chuck receiving portion 34 thereof. The cutting tool may be a rotary cutting tool, such as an end mill, though the shank may belong to some other type of tool, or even be a work piece.

The chuck 30 has a longitudinal axis L defining a front-to-rear direction, and also has an integrally-formed rear mounting portion 36 which is releasably mountable in a rotary machining tool (not shown). The mounting portion 36 extends forwardly to an integrally formed mounting flange 38, with the chuck receiving portion 34 extending forwardly from the mounting flange 38 to a receiving front face 40 which is perpendicular to the longitudinal axis L. The exact shape and operation of the mounting portion 36 and the mounting flange 38 are generally known to those skilled in the art.

A receiving bore 42 has a contoured clamping surface 44 which extends coaxially with the longitudinal axis L rearwardly from the receiving front face 40 to terminate in a bore rear end 46. The receiving bore 42 accommodates a clamping mechanism 48 having a clamping sleeve 50 and a plurality of rollers 52 accommodated in a cylindrical roller cage 54. The plurality of rollers 52 and the cage 54 are disposed between the clamping sleeve 50 and the contoured clamping surface 44 of the bore 42.

The clamping sleeve 50 is preferably constructed from a single piece of a hard and resilient material, and is preferably manufactured by conventional metal cutting operations. The clamping sleeve 50 extends from a sleeve front end 56 to a sleeve rear end 58 parallel to the longitudinal axis L. A clamping through-hole 60 in which the tool shank 32 is received extends through the clamping sleeve 50 from the sleeve front end 56 to the sleeve rear end 58 coaxially with the longitudinal axis L. The sleeve front end 56 constitutes a sleeve head 62 which protrudes radially outwardly relative to a generally cylindrical sleeve body 64 extending longitudinally rearwardly therefrom to the sleeve rear end 58 coaxially with the longitudinal axis L. The sleeve head 62 may preferably be of a hexagonal-head design having a hexagonal head front face 66 and a parallel and opposing hexagonal head rear face 68, both the front and rear head faces 66, 68 being perpendicular to the longitudinal axis L. The clamping through-hole 60 meets the head front face 66 at a sleeve bore bevel 70. A head peripheral envelope 72 has six flat head bearing surfaces 74 extends between the head front and rear faces 66, 68 parallel to the longitudinal axis L. The sleeve head 62 is designed to be driven by a correspondingly-shaped wrench (not shown). While in the embodiment shown, a hexagonal head 62 is employed, it is understood that some other shaped head (and a suitable tool therefor) may be used instead.

Figure 6:
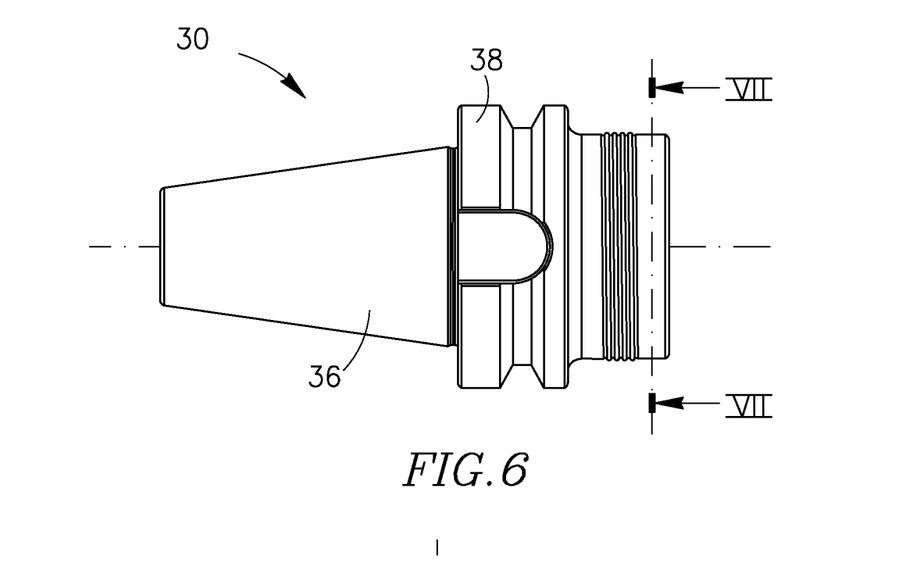
FIG. 6 shows a side view of the chuck shown in FIG. 1.
Figure 7:
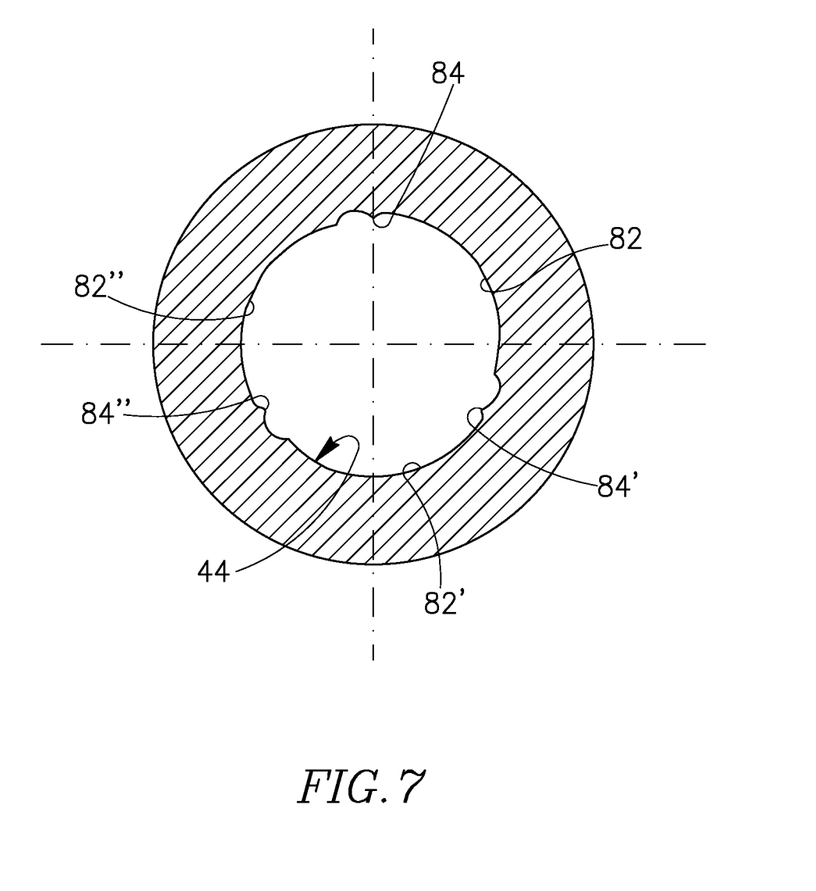
FIG. 7 shows a cross-section of the chuck shown in FIG. 1, taken along the line VII-VII in FIG. 6.

Attention is now drawn to FIGS. 6 and 7. The contoured clamping surface 44 has a plurality of successive identical clamping segments 82 formed thereon. Each clamping segment 82 extends longitudinally along the contoured clamping surface 44 parallel to the longitudinal axis L and circumferentially between a preceding clamping segment 82' and a succeeding clamping segment 82". Each clamping segment 82 is flanked by a first stop ridge 84 and a second stop ridge 84'. In one embodiment, the contoured clamping surface 44 has three identical clamping segments 82. Because the clamping segments 82 are identical, only one will be described in detail. It is also understood here that even though the term 'segment' is used, the contoured clamping surface 44 most often will have a unitary construction and comprises a single continuous surface.

Figure 8:
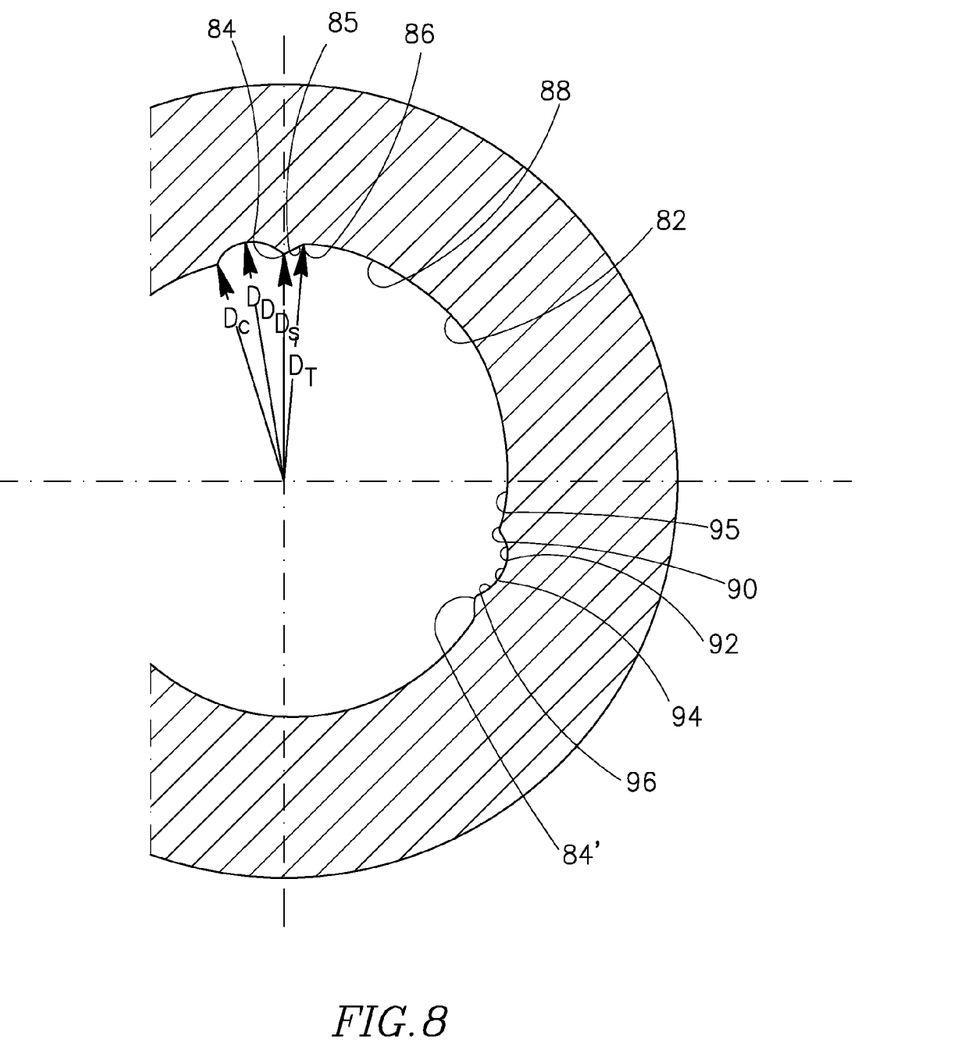
FIG. 8 shows a detail view of the cross-section of the chuck shown in FIG. 7.

As best seen in FIG. 8, the clamping segment 82 extends between adjacent stop ridges 84, 84'. A first shoulder 85 slopes in a radially outward direction from a first stop ridge 84 to a trough 86. A first ramp 88 extends from the trough 86 to a crest 90 and the trough 86 defines a trough side of the first ramp 88. As seen in the embodiment of FIG. 8, the first ramp 88 may extend for over one-half the circumferential length of the segment 82, with a gradual, radially inwardly directed incline. In some embodiments, the terminal portion of the first ramp 88, proximate the crest 90, is in the form of a plateau 95 having a reduced incline relative to the remainder of the first ramp 88. From the crest 90, a second ramp 92 extends to a depression 94. From the depression 94, a third ramp 96 extends to the second, adjacent stop ridge 84'. This sequence of features is then repeated for each segment around the circumference of the contoured clamping surface 44, it being understood that each of these features extends longitudinally therealong.

From the above, it can be seen that the trough 86 is between the stop ridge 84 and the first ramp 88; the first ramp 88 is between the trough 86 and the crest 90; and the depression 94 is formed on a far side of the crest 90. The trough 86, crest 90, depression 94 and the stop ridge 84 are located at a trough distance $D_T$, a crest distance $D_C$, a depression distance $D_D$ and a stop ridge distance $D_S$, respectively, from the longitudinal axis L, with the trough distance $D_T$ being larger than the depression distance $D_D$, and the depression distance $D_D$ being larger than the crest distance $D_C$. The stop ridge distance $D_S$ is smaller than the crest distance $D_C$. Thus, $D_S<D_C<D_D<D_T$.

Figure 4:
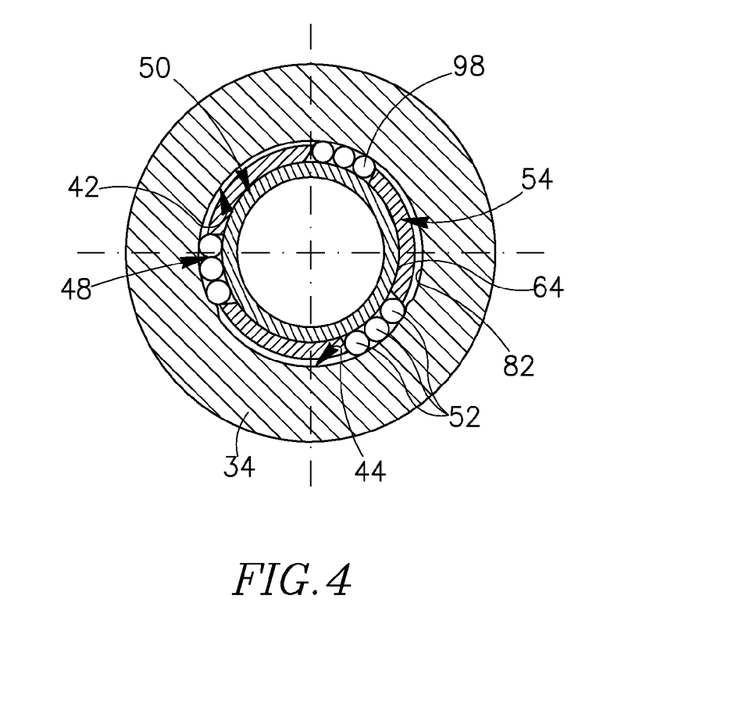
FIG. 4 shows a section view of the chuck and the cutting tool shown in FIG. 2 along section line IV--IV.
Figure 5:
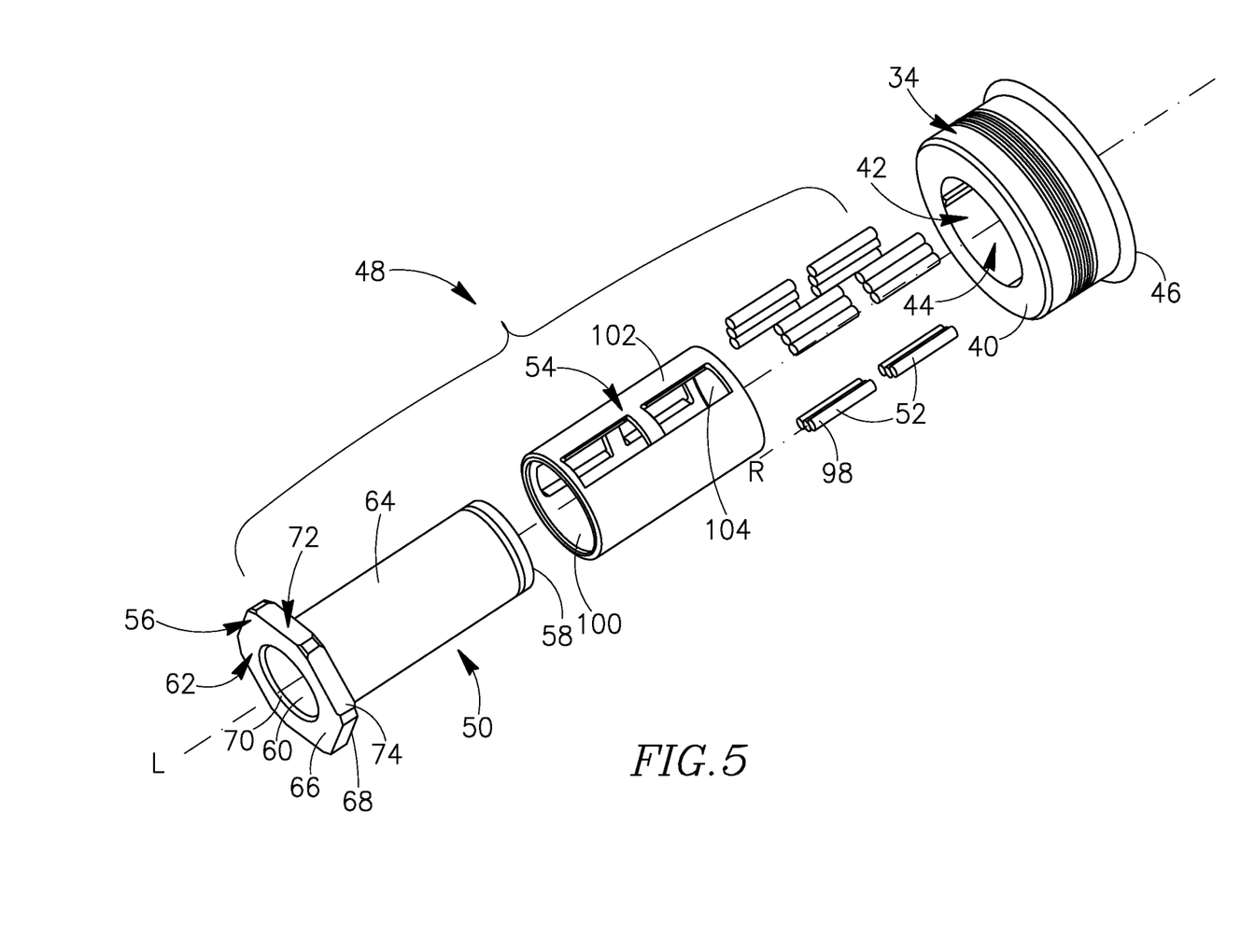
FIG. 5 shows an exploded perspective view of a clamping mechanism of the chuck shown in FIG. 1.

In accordance with some preferred embodiments, and as shown in FIGS. 4 and 5, each clamping segment 82 is associated with a roller trio 98. The three rollers 52 of the roller trio 98 may be identical. Accordingly, the clamping mechanism 48 in this embodiment has three roller trios 98.

Each roller 52 is of a solid, unitary construction, and is preferably formed of a hard and resilient material. Each roller 52 has a cylindrical shape extending longitudinally along a central longitudinal roller axis R. The roller trios 98 are kept separated from each other by the roller cage 54. The roller cage 54 is of a generally cylindrical shape extending coaxially with the longitudinal axis L and having a cage inner surface 100 and a cage outer surface 102. Three identical spaced-apart longitudinal cage through-slots 104 extend radially between the cage inner surface 100 and the cage outer surface 102 and axially parallel to the longitudinal axis L. Each of the three roller trios 98 is received in one of the three cage through-slots 104, thereby keeping each roller trio separated from adjacent roller trios 98. The cage through-slots 104 align the rollers 52 so that the longitudinal roller axis R of each roller 52 is parallel to the longitudinal axis L of the chuck 30. In accordance with some preferred embodiments, and as best seen in FIG. 5, each roller trio 98 and each corresponding cage through-slot 104 can be divided into two identical sections extending longitudinally along the longitudinal roller axis R.

Figure 1:
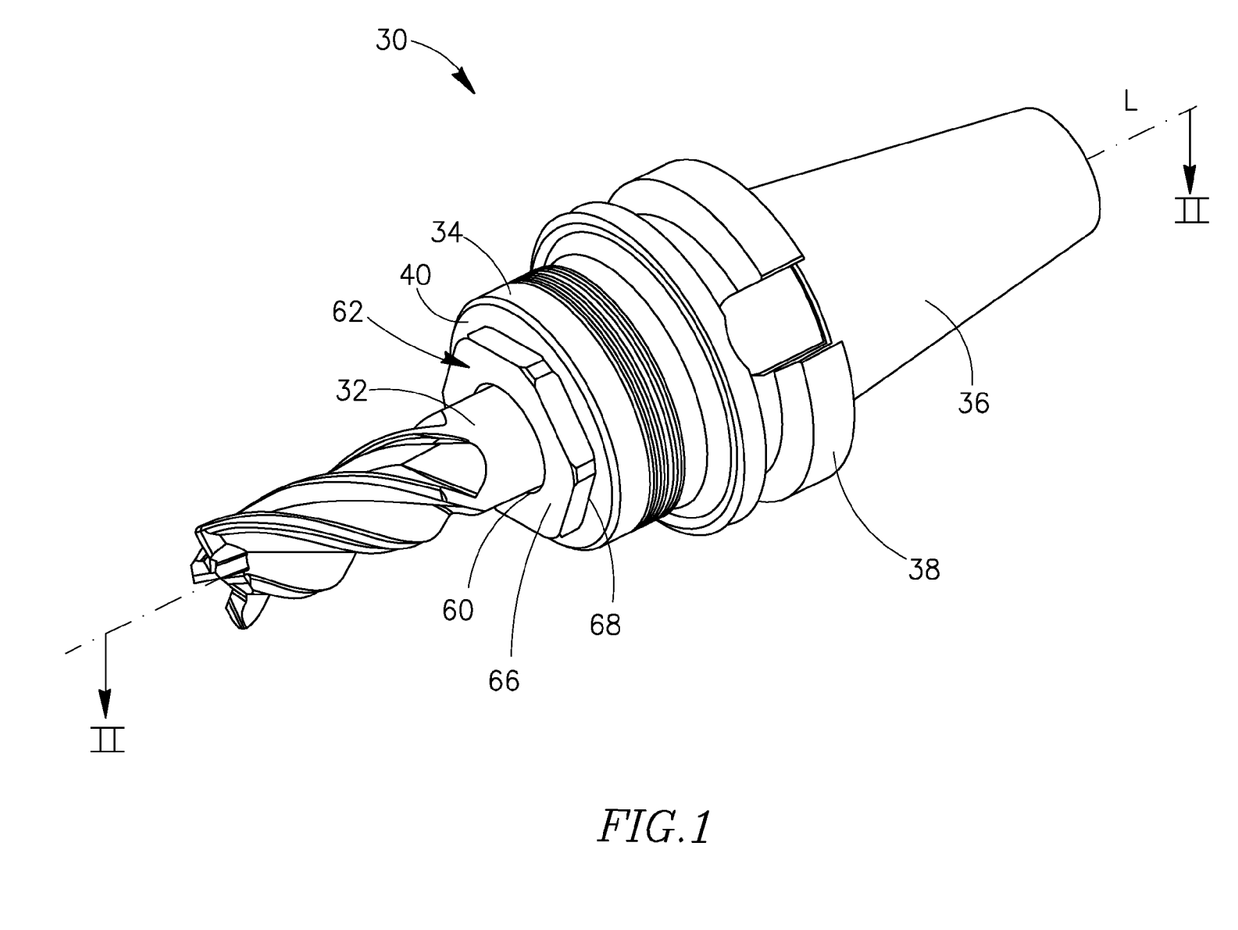
FIG. 1 shows a perspective view of a chuck and a cutting tool accommodated therein in accordance with one embodiment of the present invention.
Figure 2:
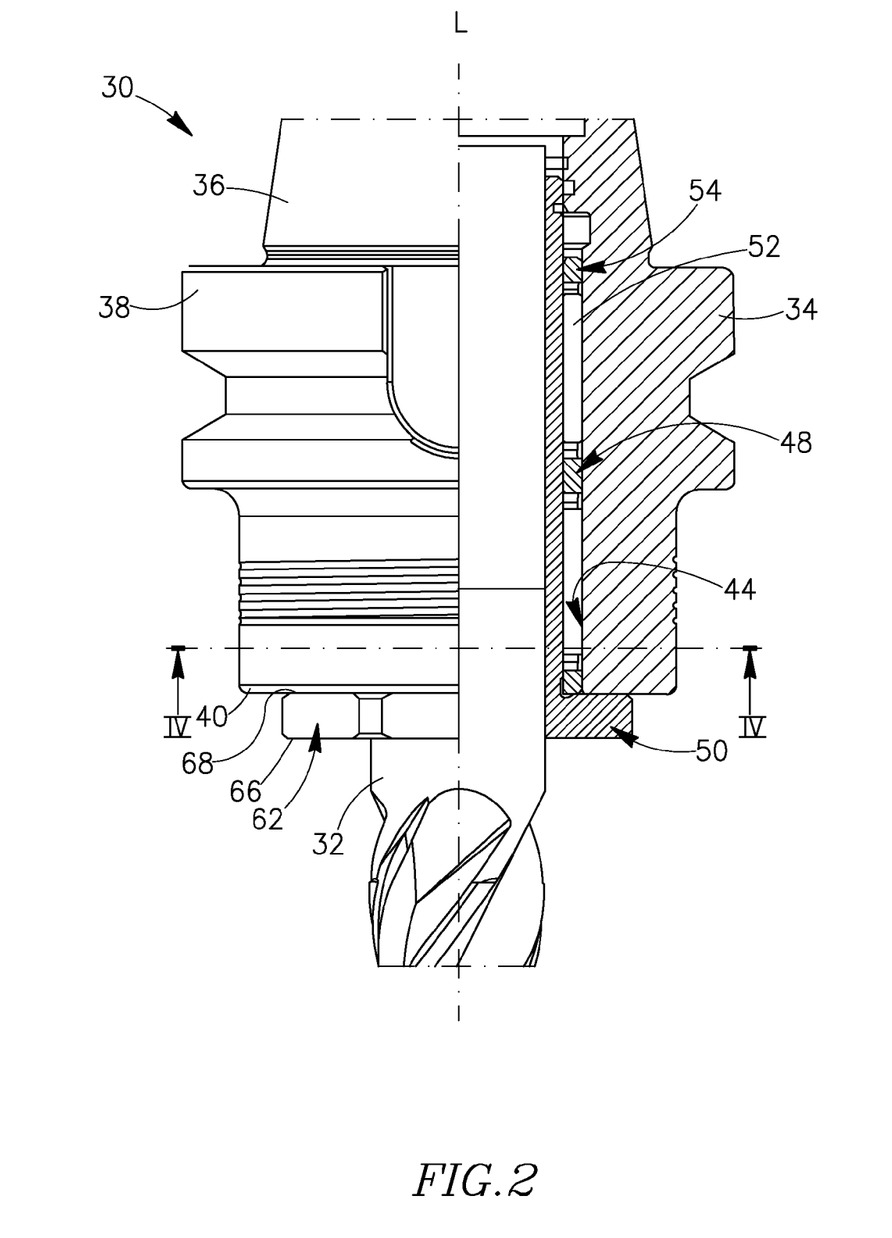
FIG. 2 shows a side view, partially in cross-section taken along line the II-II of the chuck shown in FIG. 1.
Figure 3:
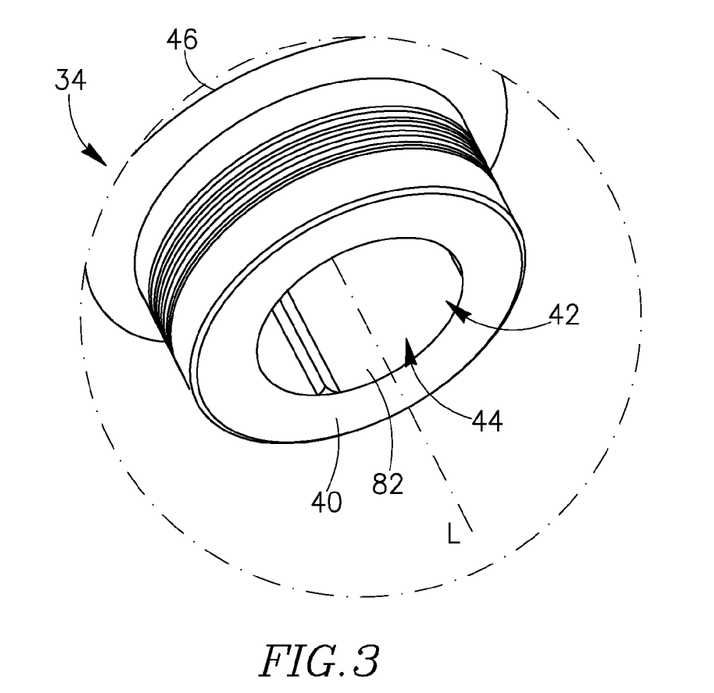
FIG. 3 shows a perspective front view of the chuck receiving portion seen in FIG. 1.

As is best shown in FIGS. 1 and 2, the clamping mechanism 48 is accommodated in the receiving portion 34 with the sleeve body 64 positioned in the receiving bore 42 coaxially with the longitudinal axis L, and with the sleeve head 62 protruding forwardly relative from the receiving portion 34 so that the head rear face 68 is adjacent to the receiving front face 40. As is best shown in FIGS. 4 and 5, when the clamping mechanism 48 is in the receiving bore 42, the roller trio 98 associated with each clamping segment 82 is pressed between the clamping segment 82 and the sleeve body 64, with the cage inner surface 100 facing the sleeve body 64 of the clamping sleeve 50 and the cage outer surface 102 facing the contoured clamping surface 44 of the receiving bore 42.

In order to secure the tool shank 32 in the chuck 30, or to release the tool shank 32 therefrom, the clamping mechanism 48 is rotatable, relative to the receiving portion 34, between a releasing position and a securing position. Rotating the clamping mechanism 48 from the releasing position to the securing position, and vice versa, may be accomplished by applying a wrench (not shown) to turn the sleeve head 62 of the clamping sleeve 50.

Figure 9:
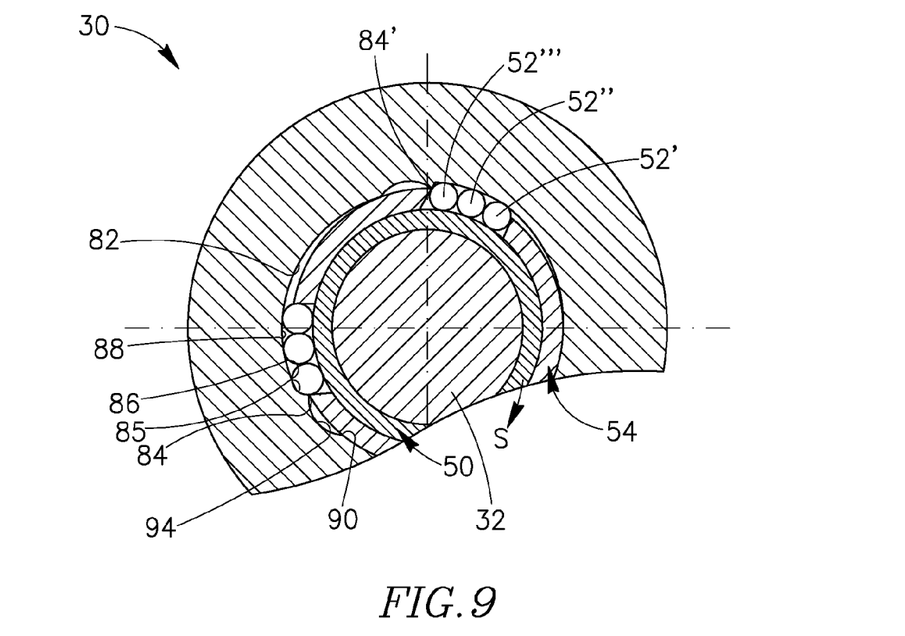
FIG. 9 shows a detail view of the chuck shown in FIG. 4, in a releasing position.

In the releasing position, as best seen in FIG. 9, each roller trio 98 is located on the trough side of the first ramp 88. The roller trio 98 includes a lead, or first, roller 52', a second roller 52" adjacent to the first roller 52' and a third roller 52''' adjacent to the second roller 52". The third roller 52''' of each roller trio 98 is positioned at the trough 86, while the second and first rollers 52", 52', respectively, are located adjacent to the third roller 52''', adjacent to the shoulder 85 of the stop ridge 84. Thus, as seen in FIG. 9, the second and first rollers 52", 52' may be at least partially positioned on the first ramp 88 adjacent to the trough 86. The clamping through-hole 60 of the clamping sleeve 50 is sized so that in the releasing position, the tool shank 32 can be freely inserted thereto or removed therefrom.

Rotating the clamping sleeve 50 towards the securing position causes the sleeve body 64 to move relative to the roller trio 98. In particular, when moving from the releasing position of FIG. 9 to the securing position of FIG. 10, the sleeve body 64 moves in the direction of the Arrow S. As a consequence of a sliding friction between the roller trio 98 and the sleeve body 64, the roller trio 98 effectively rides along the first ramp 88 in a direction from the trough 86 to the crest 90. In the securing position of FIG. 10, the first roller 52' of each roller trio 98 has traversed the crest 90, and is accommodated in the depression 94, between the crest 90 and the adjacent stop ridge 84', while the third and second rollers 52''', 52" of the roller trio 98 remain on the crest 90 and the plateau portion 95. Because the trough distance $D_T$ is greater than the crest distance $D_C$, rotating the clamping mechanism 48 into the securing position causes the rollers 52 to urge the clamping sleeve 50 radially inwardly, causing the sleeve body 64 to contract and the clamping through-hole 60 to shrink, thereby securing the tool shank 32 therein.

Figure 10:
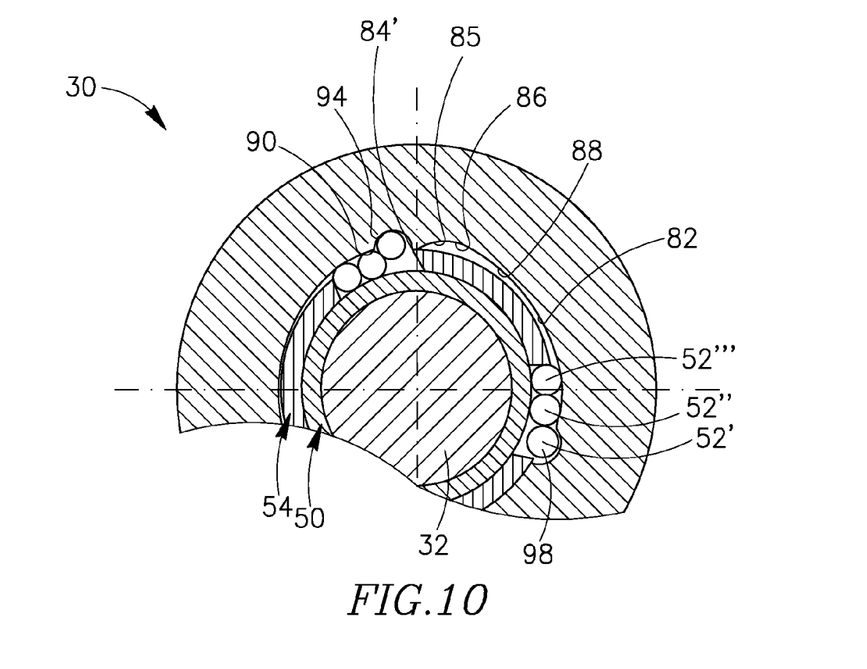
FIG. 10 shows a detail view of the chuck shown in FIG. 4, in a securing position.

When the clamping sleeve 50 is in the securing position of FIG. 10, since the depression distance $D_D$ is slightly greater than the crest distance $D_C$, and since the first roller 52' is accommodated in the depression 94, the first roller 52' is slightly radially outward relative to the crest 90. Thus, the first roller 52' prevents all the rollers 52 from sliding backwards towards the trough 86. Furthermore, the first roller 52' is slightly radially outward relative to the second and third rollers 52", 52'''. Thus, the first roller 52' may be somewhat loosely retained between the depression 94 and the sleeve body 64, and so may not apply a clamping force at all—its purpose being to lock the clamping sleeve in the securing position by virtue of occupying the depression 94 and being blocked by the stop ridge 84' so that the rollers 52', 52", 52''' are prevented from progressing in the direction of the arrow S.

It is the second and third rollers 52", 52''' that apply a radially inwardly directed force against the sleeve body 64 of the clamping sleeve 50, and in a radially outward direction against the plateau portion 95 of the contoured clamping surface 44. Thus, in the embodiment of FIG. 10, while the second and third rollers 52", 52''' apply a compressive force to contract the clamping sleeve 50 radially inwardly to frictionally hold the tool shank 32 and at the same time apply a radially outwardly directed force against the receiving bore 42 to secure the clamping mechanism 48 in the receiving portion 34, the first roller 52' ensures that the clamping mechanism 48 remains in the securing position, absent a sufficient rotational force to dislodge it from the depression 94.

In other possible embodiments of the disclosure, different chucks may have different clamping mechanisms with as few clamping segments 82 as 2 or with more clamping segments 82 for example 4, 5, 6, 7 or more and accordingly with as few roller trios 98 as 2 or with more roller trios 98 for example 4, 5, 6, 7 or more.

Figure 11:
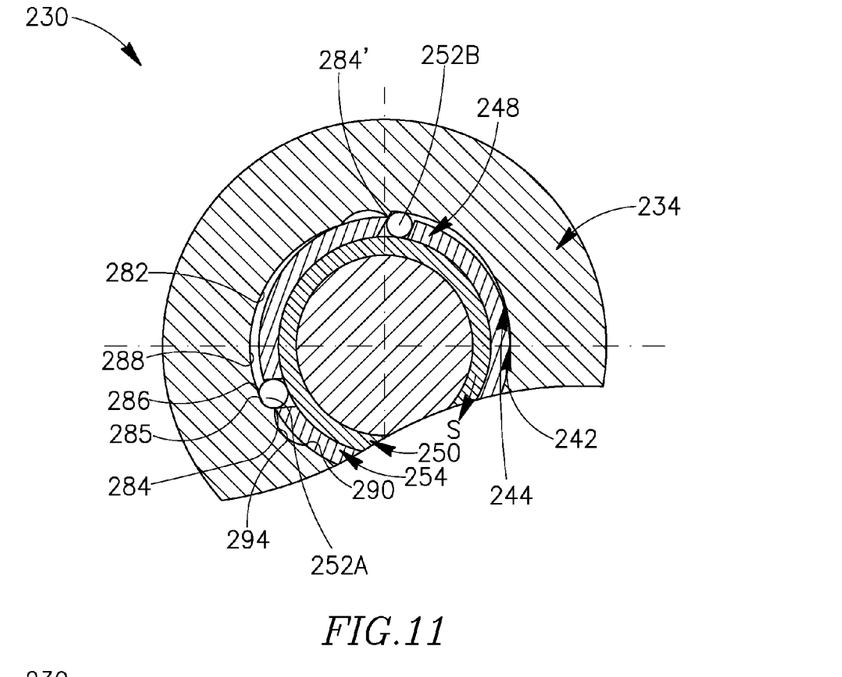
FIG. 11 shows a detail cross-section of another embodiment of the chuck in accordance with the present invention, in a releasing position.
Figure 12:
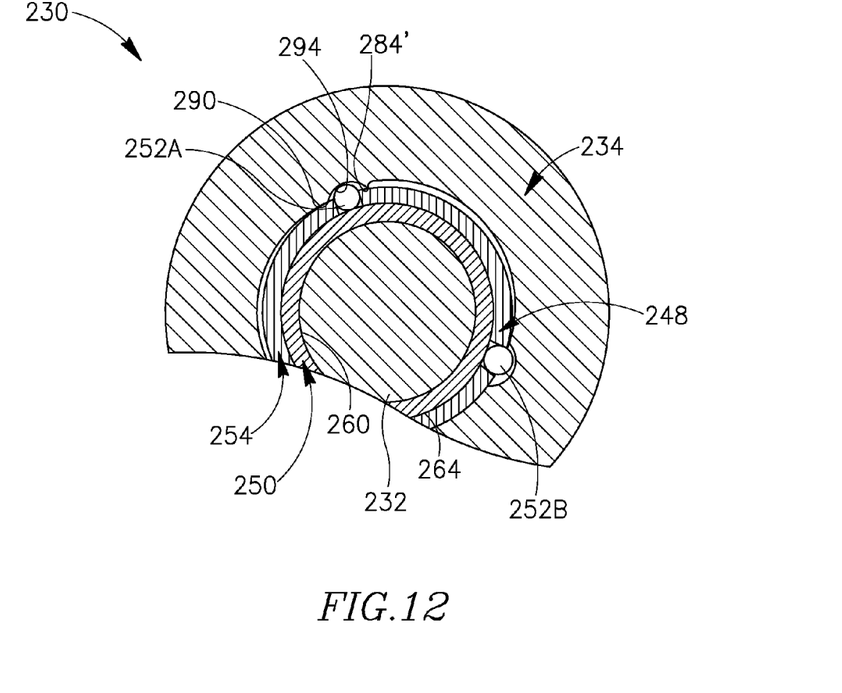
FIG. 12 shows a detail cross-section of the embodiment shown in FIG. 11, in a securing position.

Attention is now directed to FIGS. 11 and 12 showing a releasing position and a clamping position, respectively, of a chuck 230 in accordance with a second embodiment of the present invention. In this second embodiment, exactly one roller, that is, only a single roller is associated with each clamping segment. Since the chuck 230 has many features which are similar to those of the chuck 30, the similar features of the chuck 230 will be referred to herein below by reference numerals which are shifted by 200 from those of the chuck 30.

The chuck 230 has a longitudinal axis L defined much in the same manner as the longitudinal axis L of the chuck 30. A receiving portion 234 of the chuck 230 has a receiving bore 242 extending coaxially with the longitudinal axis L. The receiving bore 242 accommodates a clamping mechanism 248 having a clamping sleeve 250 and a roller cage 254, and has a contoured clamping surface 244 having a plurality of clamping segments 282 formed thereon. The clamping sleeve 250 has a clamping through-hole 260 formed therein and extending longitudinally coaxially with the longitudinal axis L. In accordance with one variation of this embodiment, the contoured clamping surface 244 has three identical clamping segments 282.

The clamping through-hole 260 has a tool shank 232 received therein. A plurality of rollers is accommodated at spaced apart intervals between the sleeve body 264 and the contoured clamping surface 244 of the receiving bore 242. However, chuck 230 has a single roller 252A, 252B, 252C, etc. associated with each clamping segment 282 while chuck 30 has a roller trio 98 of identical first, second and third rollers 52', 52" and 52''' associated with each clamping segment 82. Accordingly the clamping mechanism 248 in this second embodiment, as presented in FIGS. 11 and 12, has a total of three such rollers.

In a releasing position of the chuck 230, shown in FIG. 11, the roller 252A associated with the clamping segment 282 is located at a trough 286 of the clamping segment 282, facilitating free insertion, positioning, or removal of the tool shank 232 relative to the clamping through-bore 260. Rotating the clamping sleeve 250 towards a securing position causes the roller 252A associated with the clamping segment 282 to move relative to the sleeve body 264 on a first ramp 288 to a crest 290 of the clamping segment 282. In the securing position, as is best shown in FIG. 12, the roller 252A has traversed the crest 290, and is accommodated in a depression 294 disposed between the crest 290 and an adjacent stop ridge 284', thereby causing the sleeve body 264 to contract, and the clamping through-hole 260 to shrink and securely clamp the tool shank 232.

In this 'single roller' embodiment, the roller 252A, when accommodated in the depression 294 and blocked by the stop ridge 284' with the clamping sleeve 250 in the securing position of FIG. 12, pushes in a radially inward direction against the sleeve body 264 and also pushes in a radially outward direction against the bottom of the depression 294 and the receiving surface 244. The roller 252A, by virtue of occupying the depression 294 and being blocked by the stop ridge 284', also helps keep the clamping sleeve 250 in the securing position. Thus, in this embodiment, the roller 252A performs the functions of first roller 52', second roller 52" and also third roller 52'" in the 'roller trio' embodiment discussed above with respect to FIGS. 9 and 10.

In other possible embodiments of the disclosure, different chucks may have different clamping mechanisms with as few clamping segments 282 as 2 or with more clamping segments 282 for example 4, 5, 6, 7 or more and accordingly with as few rollers 252 as 2 or with more rollers 252 for example 4, 5, 6, 7 or more.

It can be seen from the foregoing description that a clamping segment has one or more rollers associated therewith. When the clamping sleeve is in the securing position, a first roller of the one or more rollers is accommodated in the depression, blocked by the stop ridge and helps lock the clamping sleeve in the securing position. In the embodiments described above, the remaining rollers, if present, are adjacent to the depression and help apply the necessary radial forces to secure the tool shank and also maintain the clamping sleeve in the retaining bore (the sole roller also providing this function in the 'single roller' embodiment). When the clamping sleeve is in the releasing position, the first roller is not in the depression and is not blocked by the stop ridge. Finally, as the clamping sleeve rotates from the releasing position to the securing position, the first roller rides along the ramp, passes over the crest, and enters the depression.

Although the present disclosure has been described to a certain degree of particularity, it should be understood that alterations and modifications to the present disclosure may possibly be made without departing from the scope of the disclosure as hereinafter claimed.

What is claimed is:

1. A chuck (30) for releasably securing an article comprising:
    a receiving portion (34) comprising a receiving bore (42) having a longitudinal axis (L) and having a contoured clamping surface (44) having at least one clamping segment (82);
    the at least one clamping segment (82) comprising a first ramp (88) between a trough (86) and a crest (90), a second ramp (92) between the crest (90) and a depression (94), and a third ramp (96) between the depression (94) and a stop ridge (84), wherein the trough (86), crest (90), depression (94) and stop ridge (84) are respectively, at a trough distance $D_T$, a crest distance $D_C$, a depression distance $D_D$ and a stop ridge distance $D_S$, from the longitudinal axis (L), wherein $D_S<D_C<D_D<D_T$ and wherein the trough (86) defines a trough side of the first ramp (88);
    a clamping sleeve (50) accommodated in the receiving bore (42) and being rotatable between a releasing position and a securing position;
    one or more rollers (52) associated with said at least one clamping segment (82), the one or more rollers (52) being accommodated between the clamping sleeve (50) and the contoured clamping surface (44), wherein:
    when the clamping sleeve (50) is in the securing position, a first roller (52) of said one or more rollers is accommodated in the depression (94), and at least one of said one or more rollers (52) applies a radially inwardly directed force against the clamping sleeve (50) to frictionally hold the article; and
    when the clamping sleeve (50) is in the releasing position, said first roller (52) is located on the trough side of the first ramp (88).

2. The chuck (30) as in claim 1, wherein:
    when the clamping sleeve (50) is rotated from the releasing position to the securing position, the first roller (52) rides along the first ramp (88), passes over the crest (90) and enters the depression (94).

3. The chuck (30) as in claim 1, wherein:
    when the clamping sleeve (50) is rotated from the releasing position to the securing position, the first roller (52) rides along the first ramp (88), passes over the crest (90), enters the depression (94) and is stopped by the stop ridge (84).

4. The chuck (30) as in claim 1, wherein:
    the clamping sleeve (50) is cylindrical.

5. The chuck (30) as in claim 1, wherein in the securing position said at least one of said one or more rollers (52) applies a radially outwardly directed force against the receiving bore (42).

6. The chuck (30) as in claim 1, wherein:
    the one or more rollers (52) are cylindrical, each roller having a roller axis (R) that is parallel to the longitudinal axis (L).

7. The chuck (30) as in claim 1, further comprising a cylindrical roller cage (54) positioned between the contoured clamping surface (44) and the clamping sleeve (50), the cylindrical roller cage (54) having at least one through-slot (104), the one or more rollers (52) being accommodated in said through-slot (104).

8. The chuck (30) as in claim 1, wherein:
    there are three clamping segments (82); and
    each clamping segment (82) has associated therewith one or more rollers (52).

9. The chuck (30) as in claim 8, wherein:
    each clamping segment (82) has three rollers (52) associated therewith; and
    when the clamping sleeve (50) is in the securing position, the first of the three rollers (52) is accommodated in the depression (94), and a second and a third (52) of the three rollers both apply the radially inwardly directed force against the clamping sleeve (50) and a radially outwardly directed force against the contoured clamping surface (44).

10. The chuck (30) as in claim 1, wherein:
    exactly one roller (52) is associated with the at least one clamping segment (82); and
    when the clamping sleeve (50) is in the securing position, said one roller (52) is accommodated in the depression (94), and also applies the radially inwardly directed force against the clamping sleeve (50) and a radially outwardly directed force against the contoured clamping surface (44).

11. The chuck (30) as in claim 1 wherein a roller trio (98) is associated with the at least one clamping segment (82).

12. The chuck (30) as in claim 1, wherein the article is a rotary machining tool.

13. The chuck (30) as in claim 1, wherein:
the radially inwardly directed force applied by said at least one of said one or more rollers (52) causes the clamping sleeve (50) to contract radially inwardly to thereby frictionally hold the article.

14. A tool chuck assembly comprising:
a receiving portion (34) comprising a receiving bore (42) having a longitudinal axis (L) and having a contoured clamping surface (44) having at least one clamping segment (82);
a roller cage (54) having at least one through-slot (104), the roller cage (54) configured and dimensioned to be received into the receiving bore (42);
a clamping sleeve (50) having a sleeve head (62) connected to a sleeve body (64) and a clamping hole (60), the sleeve body (64) configured and dimensioned to be received into the roller cage (54); and
one or more rollers (52) configured and dimensioned to be accommodated in the least one through-slot (104) between the sleeve body (64) and the contoured clamping surface (44), when the roller cage (54) is located in the receiving bore (42) and the sleeve body (64) is located in the roller cage (54); wherein:
the at least one clamping segment (82) comprises a first ramp (88) between a trough (86) and a crest (90), a second ramp (92) between the crest (90) and a depression (94), and a third ramp (96) between the depression (94) and a stop ridge (84), wherein the trough (86), crest (90), depression (94) and stop ridge (84) are respectively, at a trough distance $D_T$, a crest distance $D_C$, a depression distance $D_D$ and a stop ridge distance $D_S$, from the longitudinal axis (L), wherein $D_S < D_C < D_D < D_T$ and wherein the trough (86) defines a trough side of the first ramp (88); and
the clamping sleeve (50) is adjustable between:
a releasing position in which a first roller (52) of said one or more rollers is located on the trough side of the first ramp (88); and
a securing position in which said first roller (52) is accommodated in the depression (94), and at least one of said one or more rollers (52) applies a radially inwardly directed force against the clamping sleeve (50).

15. The tool chuck assembly as in claim 14, wherein:
the clamping sleeve (50) is configured to be adjusted from the releasing position to the securing position by rotating the clamping sleeve (50) such that first roller (52) rides along the first ramp (88), passes over the crest (90) and enters the depression (94).

16. The tool chuck assembly as in claim 15, wherein:
when the clamping sleeve (50) is rotated and the first roller (52) enters the depression (94), the first roller's motion is stopped by the stop ridge (84).

17. The tool chuck assembly as in claim 14, wherein:
there are three clamping segments (82); and
each clamping segment (82) has associated therewith one or more rollers (52).

18. The tool chuck assembly as in claim 14, wherein:
each clamping segment (82) has three rollers (52) associated therewith; and
when the clamping sleeve (50) is in the securing position, the first of the three rollers (52) is accommodated in the depression (94), and a second and a third (52) of the three rollers both apply the radially inwardly directed force against the clamping sleeve (50) and a radially outwardly directed force against the contoured clamping surface (44).

19. The tool chuck assembly as in claim 14, wherein:
exactly one roller (52) is associated with the at least one clamping segment (82); and
when the clamping sleeve (50) is in the securing position, said one roller (52) is accommodated in the depression (94), and also applies the radially inwardly directed force against the clamping sleeve (50) and a radially outwardly directed force against the contoured clamping surface (44).

* * * * *